United States Patent [19]

Finneyfrock

[11] Patent Number: 5,258,893
[45] Date of Patent: Nov. 2, 1993

[54] RIGIDLY MOUNTED CAB GUARD WITH LIGHTS ADAPTED WITH SHOCK ABSORBING LIGHT CAVITY CUPS

[76] Inventor: David N. Finneyfrock, 18630 Keedysville Rd., Keedysville, Md. 21756

[21] Appl. No.: 989,594

[22] Filed: Dec. 11, 1992

[51] Int. Cl.⁵ ............................................. B60Q 1/00
[52] U.S. Cl. ........................................ 362/61; 362/74; 362/369; 280/748; 280/770
[58] Field of Search .................... 362/61, 80, 83, 83.3, 362/66, 65, 267, 368, 74, 64, 369; 280/770, 748, 756

[56] References Cited

U.S. PATENT DOCUMENTS

| | | | |
|---|---|---|---|
| 3,067,974 | 12/1962 | Baldwin | 362/80 |
| 3,280,323 | 10/1966 | Pawlowski | 362/369 |
| 4,128,865 | 12/1978 | Johnson | 362/369 |
| 4,192,427 | 3/1980 | Bergman | 362/61 |
| 4,515,393 | 5/1985 | Sauter | 362/61 |
| 4,564,216 | 1/1986 | Kinyon et al. | 280/770 |
| 4,611,824 | 9/1986 | McIntosh | 280/770 |
| 4,692,845 | 9/1987 | Widhalm et al. | 362/61 |
| 4,771,369 | 9/1988 | Hymer | 362/80 |
| 4,779,168 | 10/1988 | Montgomery | 362/66 |
| 4,787,665 | 11/1988 | Rich | 362/66 |
| 4,928,216 | 5/1990 | Carr | 362/66 |
| 5,195,813 | 3/1993 | Brown | 362/61 |

*Primary Examiner*—James C. Yeung
*Attorney, Agent, or Firm*—Abdallah & Muckelroy

[57] ABSTRACT

A cab guard for the rear window of a pickup truck is provided with electrically activated brake lights which illuminate rearwardly and being further adapted with a means for insulating the lights from vibration and physical shock, the cab guard being mountable in a pair of standards on the pickup truck and rigidly attachable to the pickup truck.

6 Claims, 2 Drawing Sheets

RIGIDLY MOUNTED CAB GUARD WITH LIGHTS ADAPTED WITH SHOCK ABSORBING LIGHT CAVITY CUPS

BACKGROUND OF THE INVENTION

1. Field of the Invention

This invention relates to improvements to a cab guard for use with pickup trucks and more specifically an improvement to a cab guard for pickup truck having electrically operable lights therein.

2. Description of the Prior Art

In 1980 U.S. Pat. No. 4,192,427 was issued to Bergman for a novel means for mounting lights on an automotive service truck wherein the mounted lights could be retracted. Therein it is suggested that the mounted lights and platform containing same be mounted with sufficient pressure to hold the entire system firmly in a nonrattling condition. Thus, Bergman recognized the need to protect the mounting against rattling and attempted to resolve the problem by attaching the mount firmly. In 1985 U.S. Pat. No. 4,515,393 was issued to Sauter for a roll bar having lights therein which are electrically actuated. In Sauter it is pointed out that collisions between off road vehicles which use roll bars and cab guards is a real problem and that a number of deaths have occurred in such accidents. Further, Sauter points out, although the use of roll bar mounted headlights is an improvement over traveling in the dark, the highly directional nature of headlights does not serve to provide a wide angle light beam warning of an approaching vehicle. Sauter addresses the problem by providing a neon light which can present a broad spectral range for penetrating fog and haze. Sauter recognizes the fragile nature of the neon tubing for such lights and provides a transparent face plate to protect the neon lights from flying rocks and brush. Sauter further suggests using the neon lights with quartz lights.

In 1986 U.S. Pat. No. 4,564,216 was issued to Kinyon for a rack to be mounted on the rear of a pickup truck and its standards and further notes that the grill protects the back window glass. In late 1986 U.S. Pat. No. 4,611,824 was issued to McIntosh for a cab guard which included a rigid screen structure and a pair of rigid end brackets but no electrically activated lighting means. McIntosh notes that due to the versatility of pickups and hauling various sizes, shapes and masses of loads this use poses a number of risks and dangers for placing and carrying a load in a bed of the truck. The sole purpose of the cab guard of McIntosh is to protect the occupants and the rear window from damage from the shifting and loading of these loads when carried on the truck's bed.

The following year in 1987 U.S. Pat. No. 4,692,845 was issued to Widhalm for an improvement in the roll bar structure, namely, a flip over lamp bracket. The bracket provided a means by which auxiliary lamps may be selectively directed either forwardly or rearwardly with no special mounting means being specified to protect the lights the shock of off road operation. No improvement against vibration is provided since it is noted that the individual lamp will not be subjected to any greater vibration than if it were directly mounted on the vehicle in a conventional manner.

In 1988 Montgomery was issued U.S. Pat. No. 4,779,168 for a conventionally mounted but remotely controllable movable light system. The lights are hard wired with electrical conductors to the adjustment control means, electric motors or other devices designed to adjust the light position. Of consequence to the prior art is U.S. Pat. No. 4,787,665 issued in 1988 to Rich for an automobile roof spoiler with retractable lamps adapted for trucks, vans, campers and off road vehicles. The lamps are rotatably mounted within the roof's spoiler such that rotation of the lamps to an upright position faces the lamps forwardly above the roof. The spoiler is mounted with gasket pads to prevent damage to the roof and to reduce vibrational noise. And, in 1990 U.S. Pat. No. 4,928,216 was issued to Carr for a light mounted assembly having raised and lowered positions. The lights are rigidly mounted to the vehicle body without any means of protecting the lights from the destructive effects of vibration.

SUMMARY OF THE INVENTION

The present invention is an improvement in a cab guard rigidly mounted on a pickup truck adapted for offroad operation or used on rough roads and which contains electrically operated lights. The improvement comprising a rubber cup housing wherein each light is mounted in a rubber cup housing adapted and made of a soft rubber material which absorbs vibration and shock and also insulates the light from vibration and shock.

It is thus an object of the present invention to provide a novel improvement to a cab guard having lights mounted therein for the purpose of producing an illumination visible to other vehicles to locate and avoid colliding with the vehicle.

Another object of the present invention is to provide a means for extending the life of these illuminating lights mounted in the cab guard by providing insulation from shock and vibration caused by the operation of the vehicle in rough terrain off road.

Further objects and advantages of the present invention will be apparent from the following detailed description taken in conjunction with the appended claims, to wit:

BRIEF DESCRIPTION OF THE DRAWINGS

FIG. 2b is a left side view of the cab guard as shown in FIG. 2a.

FIG. 2c is a right side view of the cab guard of FIG. 2a.

FIG. 2d is a front view of the cab guard shown in FIG. 2a.

FIG. 3b is a top view of the rubber shock insulating cup improvement shown in cross section in FIG. 3a.

DESCRIPTION OF THE PREFERRED EMBODIMENT

Figure 1:
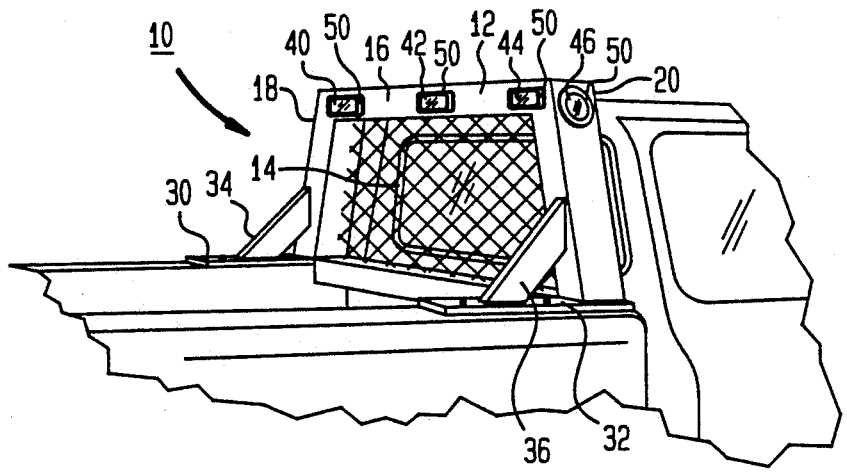
FIG. 1 is a perspective view of a cab guard according to a typical embodiment of the present invention wherein rearward facing lights and sideward facing lights are mounted in the novel rubber cup improvement.

For the purpose of promoting and understanding of the principles of the invention, reference will now be made to the embodiment illustrated in the drawings and specific language will be used to describe the same.

The cab guard of the present invention is alternatively mountable in pickup trucks, off road vehicles and the like and is permanently mounted by bolting to the bed of the truck in the manner shown generally in FIG. 1. Shown in FIG. 1 is a cab guard 10 which includes a screen structure 12 which has a planer screen mesh 14 fitted into a frame 16 and left and right end brackets 18 and 20, respectively, each having a base portion 30 and 32 and an arm portion 34 and 36, respectively. The screen mesh 14 is sufficiently expanded so as not to unduly limit or restrict viewing therethrough.

Figure 2A:
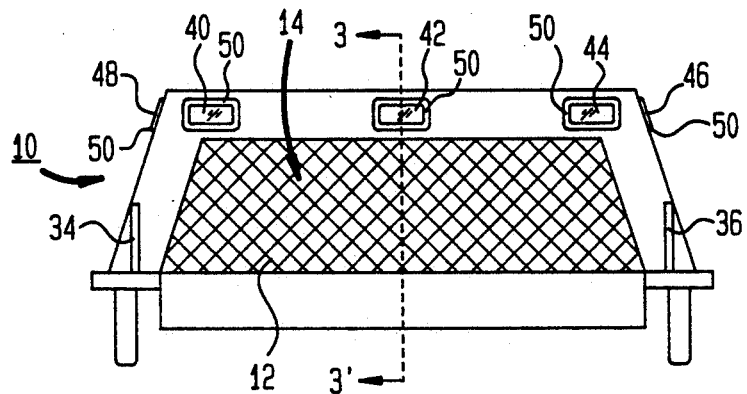
FIG. 2a is a rearview of the cab guard shown in FIG. 1.
Figure 2B:
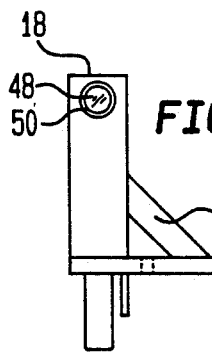
Figure 2C:
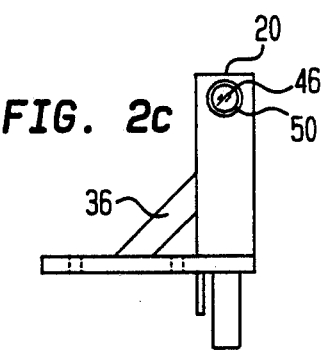
Figure 2D:
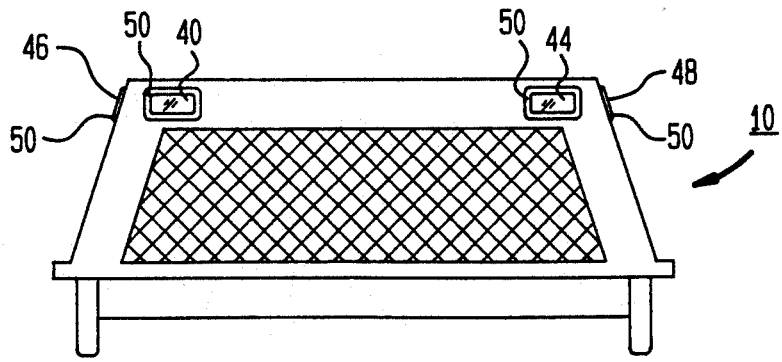

The cab guard 10 has a plurality-of rear facing electrically activated lights 40, 42 and 44. The cab guard 10 also has at least two sideward facing lights 46 as shown in FIG. 1 and also 48 as shown in FIG. 2a. Each of these lights is mounted in a shock absorbing rubber cup 50 as further shown in FIGS. 2b, 2c and 2d.

Figure 3A:
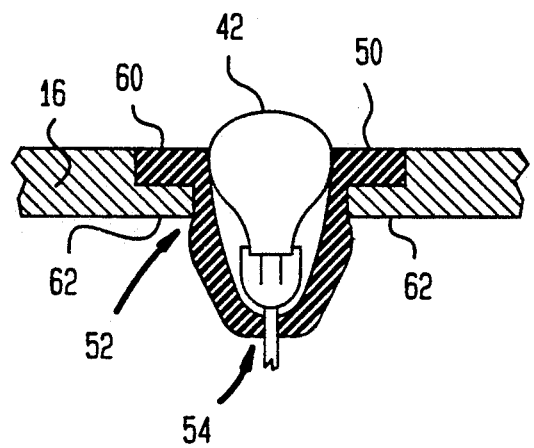
FIG. 3a is a partial cross sectional view of one of the lights of the cab guard shown in FIG. 2a taken along the line 3—3' of FIG. 2a and viewed in the direction of the arrows.
Figure 3B:
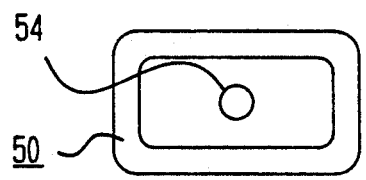
Figure 3C:
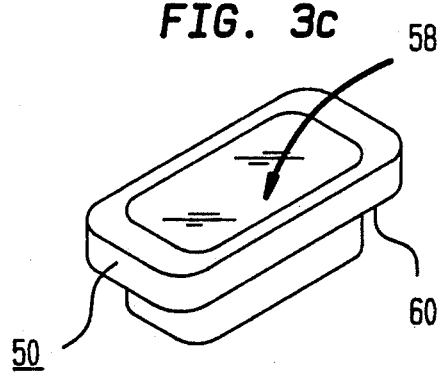
FIG. 3c is a perspective view of the novel rubber shock absorbing cup shown in FIG. 3b.
Figure 3D:
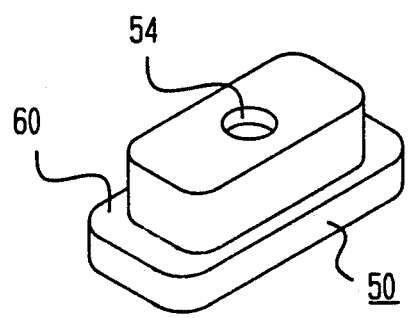
FIG. 3d is a perspective view of the bottom of the rubber shock absorbing cup shown in FIG. 3c.

In FIG. 3a there is shown a cross section of the light 42 mounted in a rubber cup 50 inserted in an aperture 52 formed in the frame 16 of the cab guard shown generally at FIG. 2a. The rubber cup 50 has a U-shaped cross section and a small aperture 54 at the bottom of the cup 50 which allows an electrical wiring to pass through. The cup 50 has an enlarged depressed cavity 58 as shown in FIG. 3c which is adapted to allow bulbs such as the bulb 42 shown in FIG. 3a to fit therein. The cup 50 is adapted with a lip 60. Referring back to FIG. 3a the aperture 52 and similar apertures in the frame 16 are adapted with a lip 62 which engages the lip 60 of the cup 50 when the cup 50 is inserted into the aperture 52 of the frame 16. The cup 50 is very flexible and made of a soft spongy rubber and is compressed to fit into the aperture 52.

As further shown in FIG. 3a the cup 50 when forced through the aperture 52 of the frame 16 provides an interference fit into the aperture 52 with the lip 60 holding the bulb or light 42 firmly and provided shock absorption from vibration.

The improvement in the cab guard of the present invention, while appearing only a minor aspect of the assembly provides significant savings when the cost of such lights is considered and the cost of the labor of replacing these lights is considered. Further, there exists a significant need to provide and extend the life of these lights in view of the tremendous vibrational stresses they undergo during frequent operation in off road terrain and rough terrain rural situations.

While the invention has been illustrated and described in detail in the drawings and the foregoing description, the same is to be considered as illustrative and not restrictive in character, it being understood that only the preferred embodiment has been shown and described that all changes and modifications that become within the spirit of the invention are protected pursuant to the doctrine of equivalence.

What is claimed is:

1. A cab guard for a pickup truck with brakes and electrically activated brake lights, the pickup truck having a cab with a rear window comprising:

a rigid screen structure including a planar screen mesh having two ends, a pair of rigid end brackets each constructed and adapted for attachment to one of the ends of said screen structure, mounting means for mounting said screen structure onto said pickup truck behind said rear window of said cab, said end brackets being attached to the ends of said screen structure and extending outwardly from said screen structure in a plane substantially perpendicular to said screen mesh, said mounting means being for mounting each of said end brackets to said pickup truck near each of said ends of said screen structure, a hollow frame surrounding said rigid screen structure, said hollow frame having a transverse top member, a first side member at one end of said screen structure, and a second side member at the other end of said screen structure a plurality of cavities in said transverse top member, each cavity opening rearwardly and having inserted therein an electrically powered rearwardly facing light, each rearwardly facing light being adapted to be electrically actuated upon application of the brakes for said pickup truck, a first cavity in the first side member opening sidewardly away from said pickup truck, said first cavity having therein a first sideward facing electrically powered light, a second cavity in the second side member opening sidewardly away from said pickup truck, said second cavity having therein a second sideward facing electrically powered light, means for insulating each said light from vibration and physical shock comprising a spongy rubber cup in each said cavity, each cup being adapted to receive a light, said cup having a wall thickness greater than about 0.5 inches and less than about 0.75 inches.

2. A cab guard for a pickup truck with brakes and electrically activated brake lights, the pickup truck having a cab with a rear window comprising:

a rigid screen structure including a planar screen mesh having two ends, a pair of rigid end brackets each constructed and adapted for attachment to one of the ends of said screen structure, mounting means for mounting said screen structure onto said pickup truck behind said rear window of said cab, said end brackets being attached to the ends of said screen structure and extending outwardly from said screen structure in a plane substantially perpendicular to said screen mesh, said mounting means being for mounting each of said end brackets to said pickup truck near each of said ends of said screen structure, a hollow frame surrounding said rigid screen structure, said hollow frame having a transverse top member, a first side member at one end of said screen structure, and a second side member at the other end of said screen structure, a plurality of cavities in said transverse top member, each cavity opening rearwardly and having inserted therein an electrically powered rearwardly facing light, each rearwardly facing light being adapted to be electrically actuated upon application of the brakes for said pickup truck, a first cavity in the first side member opening sidewardly away from said pickup truck, said first cavity having herein a first sideward facing electrically powered light, a second cavity in the second side member opening sidewardly away from said pickup truck, said second cavity having therein a second sideward facing electrically powered light, means for insulating each said light from vibration and physical shock comprising a spongy rubber cup in each said cavity, each cup being adapted to receive a light, said pickup truck being adapted with four wheel drive for use as an all terrain vehicle.

3. A cab guard for a pickup truck according to claim 2 wherein said frame is made of steel and said lights are sealed fragile reflector lights.

4. A cab guard for a pickup truck according to claim 3 wherein said first and second sidewardly facing electrically powered lights are electrically actuated by the brakes of said pickup truck whereby visibility of braking warnings to other vehicles approaching said pickup truck from off road directions is substantially enhanced.

5. A cab guard for a pickup truck according to claim 4 wherein said rubber cups each have an inwardly facing lip around the opening adapted to allow said sealed fragile reflector lights therein to be retained and easily removed therefrom.

6. A cab guard for a pickup truck according to claim 5 wherein said cups each have an inside opening and said lips extend inwardly covering a portion of each of the inside openings of each said cup.

* * * * *